(12) United States Patent
Sato et al.

(10) Patent No.: US 8,819,015 B2
(45) Date of Patent: Aug. 26, 2014

(54) OBJECT IDENTIFICATION APPARATUS AND METHOD FOR IDENTIFYING OBJECT

(75) Inventors: Hiroshi Sato, Kawasaki (JP); Katsuhiko Mori, Kawasaki (JP); Yoshinori Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 253 days.

(21) Appl. No.: 12/685,551

(22) Filed: Jan. 11, 2010

(65) Prior Publication Data
US 2010/0205177 A1 Aug. 12, 2010

(30) Foreign Application Priority Data
Jan. 13, 2009 (JP) .................... 2009-005030

(51) Int. Cl.
G06F 17/30 (2006.01)

(52) U.S. Cl.
USPC ............ 707/737; 707/756; 707/915; 707/955

(58) Field of Classification Search
None
See application file for complete search history.

(56) References Cited

U.S. PATENT DOCUMENTS

| | | | | |
|---|---|---|---|---|
| 4,987,480 A * | 1/1991 | Lippman et al. | ........... | 348/396.1 |
| 6,181,805 B1 * | 1/2001 | Koike et al. | .................. | 382/118 |
| 6,421,463 B1 * | 7/2002 | Poggio et al. | ................. | 382/224 |
| 6,430,566 B1 * | 8/2002 | Shiiyama | ...................... | 382/276 |
| 6,463,176 B1 | 10/2002 | Matsugu | | |
| 6,892,193 B2 * | 5/2005 | Bolle et al. | ...................... | 706/20 |
| 6,970,602 B1 * | 11/2005 | Smith et al. | .................. | 382/232 |
| 6,996,275 B2 * | 2/2006 | Edanami | ...................... | 382/218 |
| 7,123,754 B2 * | 10/2006 | Matsuo et al. | ................ | 382/118 |
| 7,164,798 B2 * | 1/2007 | Hua et al. | ...................... | 382/229 |
| 7,409,091 B2 * | 8/2008 | Sung et al. | .................... | 382/191 |
| 7,532,745 B2 | 5/2009 | Inoue | | |
| 7,533,076 B2 * | 5/2009 | Harris et al. | ..................... | 706/59 |
| 7,593,551 B2 * | 9/2009 | Kamei | .......................... | 382/118 |
| 7,912,246 B1 * | 3/2011 | Moon et al. | ................... | 382/103 |

(Continued)

FOREIGN PATENT DOCUMENTS

| | | |
|---|---|---|
| JP | 3078166 B2 | 8/2000 |
| JP | 2002-8032 A | 1/2002 |
| JP | 2003-242486 | 8/2003 |
| JP | 2003-296735 A | 10/2003 |
| JP | 2003-323622 A | 11/2003 |
| JP | 2008-131204 A | 6/2008 |

OTHER PUBLICATIONS

Baback Moghaddam, Beyond Eigenfaces :Probabilistic Matching for Face Recognition(M.I.T Media Laboratory Perceptual Computing Section Technical Report No. 433), 3rd IEEE Int'l Conference on Automatic Face & Gesture Recognition, Nara, Japan, Apr. 1998.

(Continued)

*Primary Examiner* — Kaveh Abrishamkar
*Assistant Examiner* — James J Wilcox
(74) *Attorney, Agent, or Firm* — Canon USA Inc IP Division

(57) ABSTRACT

An object identification apparatus includes an image data input unit configured to input captured image data including an object, an object identification data generation unit configured to generate data for identifying the object by extracting a feature vector from a partial area of the input image data to convert the feature vector according to the partial area, an object dictionary data storage unit configured to store object dictionary data generated from previously recorded image data, and an object identification unit configured to identify a class to which the object belongs, which is included in the image data input by the image data input unit, based on the data for identifying the object and the object dictionary data.

5 Claims, 17 Drawing Sheets

(56) References Cited

U.S. PATENT DOCUMENTS

| | | | |
|---|---|---|---|
| 7,920,745 B2* | 4/2011 | Song et al. | 382/225 |
| 7,995,805 B2* | 8/2011 | Suzuki et al. | 382/118 |
| 2002/0126880 A1* | 9/2002 | Dobashi | 382/118 |
| 2002/0136433 A1* | 9/2002 | Lin | 382/118 |
| 2006/0140455 A1* | 6/2006 | Costache et al. | 382/118 |
| 2006/0239584 A1* | 10/2006 | Motomura et al. | 382/274 |
| 2007/0127787 A1* | 6/2007 | Castleman et al. | 382/118 |
| 2007/0268398 A1* | 11/2007 | Raskar et al. | 348/370 |
| 2008/0075361 A1* | 3/2008 | Winn et al. | 382/155 |
| 2008/0187185 A1* | 8/2008 | Misawa et al. | 382/118 |

OTHER PUBLICATIONS

Probabilistic Visual Learning for Object Representation (IEEE Transactions on Patternanalysis and Machine Intelligence, vol. 19, No. 7, Jul. 1997).

Burges, C.J.C. (1996), 'Simplified Support Vector Decision Rules,' International Conference on Machine Learning (pp. 71-77).

Viola & Jones (2001), 'Rapid Object Detection Using a Boosted Cascade of Simple Features,' Computer Vision and Pattern Recognition.

* cited by examiner

FIG. 16

| AREA | ALGORITHM | CAMERA PARAMETER | ILLUMINATION CONDITION | ORIENTATION | EXPRESSION | ... | PARAMETER |
|---|---|---|---|---|---|---|---|
| 1 | PCA | E11, E12, ... | NORMAL | FRONT | SMILE | ... | P1, P2, ... |
| 2 | PCA | E11, E12, ... | NORMAL | LEFT SIDEWAYS | NORMAL | ... | P1, P2, ... |
| 3 | PCA | E31, E32, ... | — | — | — | ... | P3, P4, ... |
| 4 | ICA | E41, E42, ... | OBLIQUE LIGHT | LEFT SIDEWAYS | NORMAL | ... | I1, I2, ... |
| 5 | ICA | E41, E42, ... | OBLIQUE LIGHT | — | — | ... | I1, I2, ... |
| 6 | ICA | E61, E62, ... | — | — | — | ... | I3, I4, ... |
| 7 | FDA | E71, E72, ... | BACKLIGHT | FRONT | SMILE | ... | F1, F2, ... |
| 8 | FDA | E81, E82, ... | BACKLIGHT | FRONT | SMILE | ... | F1, F2, ... |
| 9 | FDA | E81, E82, ... | — | — | UNCLEAR | ... | F3, F4, ... |
| 10 | ... | E81, E82, ... | — | — | SMILE | ... | ... |
| 11 | ... | E81, E82, ... | ... | RIGHT SIDEWAYS | NORMAL | ... | ... |
| ... | ... | ... | ... | ... | | ... | ... |

OBJECT IDENTIFICATION APPARATUS AND METHOD FOR IDENTIFYING OBJECT

BACKGROUND OF THE INVENTION

1. Field of the Invention

The present invention relates to an object identification apparatus and a method for identifying an object in image data.

2. Description of the Related Art

A face identification technique, for example, for identifying an individual face has been known as an identification technique for identifying an object in image data with an object in another image. Hereinafter, in the present specification, the term "identification of an object" refers to the determination of difference in an object as an individual (difference in person as an individual, for example). On the other hand, the term "detection of an object" refers to the determination of an individual falling under the same category without discriminating individuals (for example, a face is detected without discriminating individuals).

A method described in the following literature, for example, is known as the face identification technique, "Baback Moghaddam, Beyond Eigenfaces: Probabilistic Matching for Face Recognition (M.I.T. Media Laboratory Perceptual Computing Section Technical Report No. 433), Probabilistic Visual Learning For Object Representation (IEEE Transactions On Pattern Analysis and Machine Intelligence, Vol. 19, No. 7, July 1997)." This method is algorithm that enables the registration and the additional learning of a face in real time by replacing an issue of identifying an individual by a face with a two-class identification issue of a feature class called a difference face.

The face identification using a support vector machine (SVM), for example, requires n SVM identifiers for identifying registered human faces from other faces to identify n human faces. Learning of the SVM is needed when registering human faces. The learning by the SVM requires a large amount of data of human faces desired to be registered, already registered human faces and other human faces and is time-consuming, so that a previously calculating method is generally used.

According to the methods described in the above literature, the need for the additional learning can be eliminated by replacing the issue of identifying an individual with identification issues of two classes described below:

Intra-personal class: Feature class such as variation in illumination and variation in expression and orientation between the images of the same person; and Extra-personal class: Variation feature class between the images of a different person.

Assuming that the distribution of the above two classes is constant irrespective of a specific individual, an individual face identification issue is caused to result in identification issues of the above two classes to form an identifier. A large amount of images is previously prepared to learn an identifier for identifying the variation feature class between the same persons from the variation feature class between different persons.

For a new register, only the image of its face (or, a result in which a required feature is extracted) may be stored. In identification, a difference feature is drawn out from two images to cause the identifier to determine whether a person is the same person or not. This eliminates the need for learning the SVM to enable registration at real time.

Factors lowering the identification performance of an apparatus and a method for identifying objects (more specifically, human faces) as described above arise from variation between two images for registration and authentication. In other words, the factors arise from variation between two images of objects (human faces) to be identified, more specifically, those arise from occlusion due to illumination condition, direction, orientation, and other objects and variation due to expression. Increase in such a variation significantly reduces the identification performance.

In Japanese Patent Application Laid-Open No. 2003-323622, the above problem is solved in such a manner that a pattern matching is carried out several times for each partial area, outliers among the results are removed, and matching degrees of each partial area are integrated to ensure robustness to the variation.

The feature quantity per se is desirably robust to variation to maintain the identification performance even under the condition that variation is great like a human face and various image shooting conditions. Alternatively, an approach is effective in which such a conversion that an extracted feature quantity is made robust to variation is provided to improve the identification performance.

In application to a digital camera or a web camera, it is general that shooting condition for and variation (direction and expression) in an image are greatly different between in registration and in identification. The selection of the feature quantity that is robust to variation and a method of changing the feature quantity is a significant problem of improving an identification rate.

SUMMARY OF THE INVENTION

The present invention is directed to an object identification apparatus and a method for identifying an object that enable highly accurate identification even if a shooting condition and variation condition are different between in registration and in identification.

According to an aspect of the present invention, an object identification apparatus includes an image data input unit configured to input captured image data including an object, an object identification data generation unit configured to generate data for identifying the object by extracting a feature vector from a partial area of the input image data to convert the feature vector according to the partial area, an object dictionary data storage unit configured to store object dictionary data generated from previously recorded image data, and an object identification unit configured to identify a class to which the object belongs, which is included in the image data input by the image data input unit, based on the data for identifying the object and the object dictionary data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 16 illustrates an example of an LUT illustrating the correspondence of the attribute information of an object to a feature vector conversion method.

DESCRIPTION OF THE EMBODIMENTS

Various exemplary embodiments, features, and aspects of the invention will be described in detail below with reference to the drawings. It is to be noted that the relative arrangement of the components, the numerical expressions, and numerical values set forth in these embodiments are not intended to limit the scope of the present invention.

Figure 1:
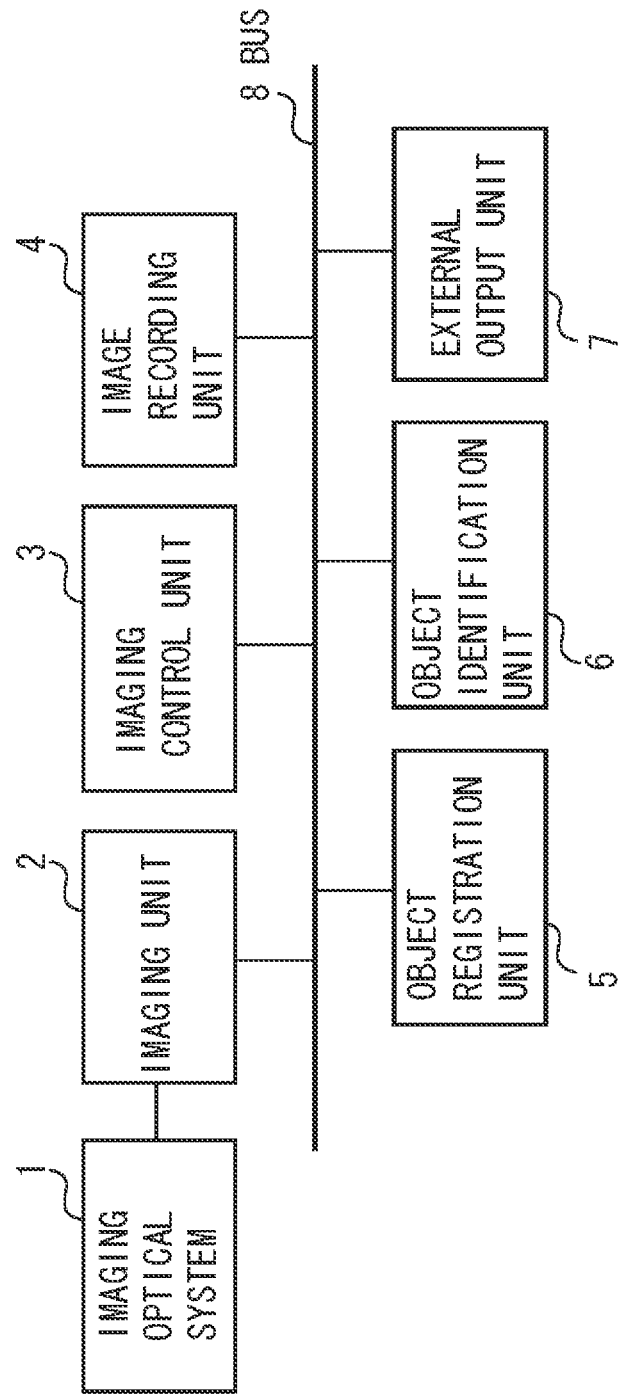
FIG. 1 is a block diagram illustrating an example configuration of an object identification apparatus.

A first exemplary embodiment is described below. FIG. 1 illustrates an example configuration of an object identification apparatus 100. As illustrated in FIG. 1, the object identification apparatus 100 includes an imaging optical system 1, an imaging unit 2, an imaging control unit 3, an image recording unit 4, an object registration unit 5, and an object identification unit 6.

The object identification apparatus 100 further includes an external output unit 7 for outputting an object identification result and a bus 8 for controlling the components and connecting them with each other. The object registration unit 5 and the object identification unit 6 may typically be a dedicated circuit (ASIC) and a processor (e.g., a reconfigurable processing or, a DSP, and a CPU) respectively or in a single dedicated circuit and a generalized circuit (e.g., CPU for PC).

The imaging optical system 1 includes an optical lens provided with a zooming mechanism. The imaging optical system 1 may include a driving mechanism in the pan and the tilt axis direction. A charge-coupled device (CCD) or a complementary metal-oxide semiconductor (CMOS) sensor is typically used as the image sensor of the imaging unit 2 and outputs a predetermined video signal (e.g., a signal acquired by sub-sampling and block-reading) as image data by a reading control signal from a sensor (not illustrated).

The imaging control unit 3 controls timing at which shooting is actually performed based on instructions (such as viewing angle adjustment, shutter pressing, and the like) from a photographer, and information from the object registration unit 5 or the object identification unit 6. The image recording unit 4 includes a semiconductor memory, stores image data transferred (input) from the imaging unit 2 and transfers the image data at a predetermined timing in response to a request from the object registration unit 5 or the object identification unit 6.

The object registration unit 5 extracts information on an object to be identified from the image data and stores the information. A further detailed configuration of the object registration unit 5 and more specific contents of actual processing are described later. The object identification unit 6 identifies an object in the image data based on the image data and data acquired from the object registration unit 5. A more specific configuration of the object identification unit 6 and detailed processing therein are described later.

The external output unit 7 is typically a monitor such as a CRT or a TFT liquid crystal display and displays the image data acquired from the imaging unit 2 and the image recording unit 4, or superimposes the outputs of the object registration unit 5 and the object identification unit 6 on the image data. The external output unit 7 may output the result outputs of the object registration unit 5 and the object identification unit 6 as electronic data to an external memory. The bus 8 controls the components and connects them with each other.

Figure 2:
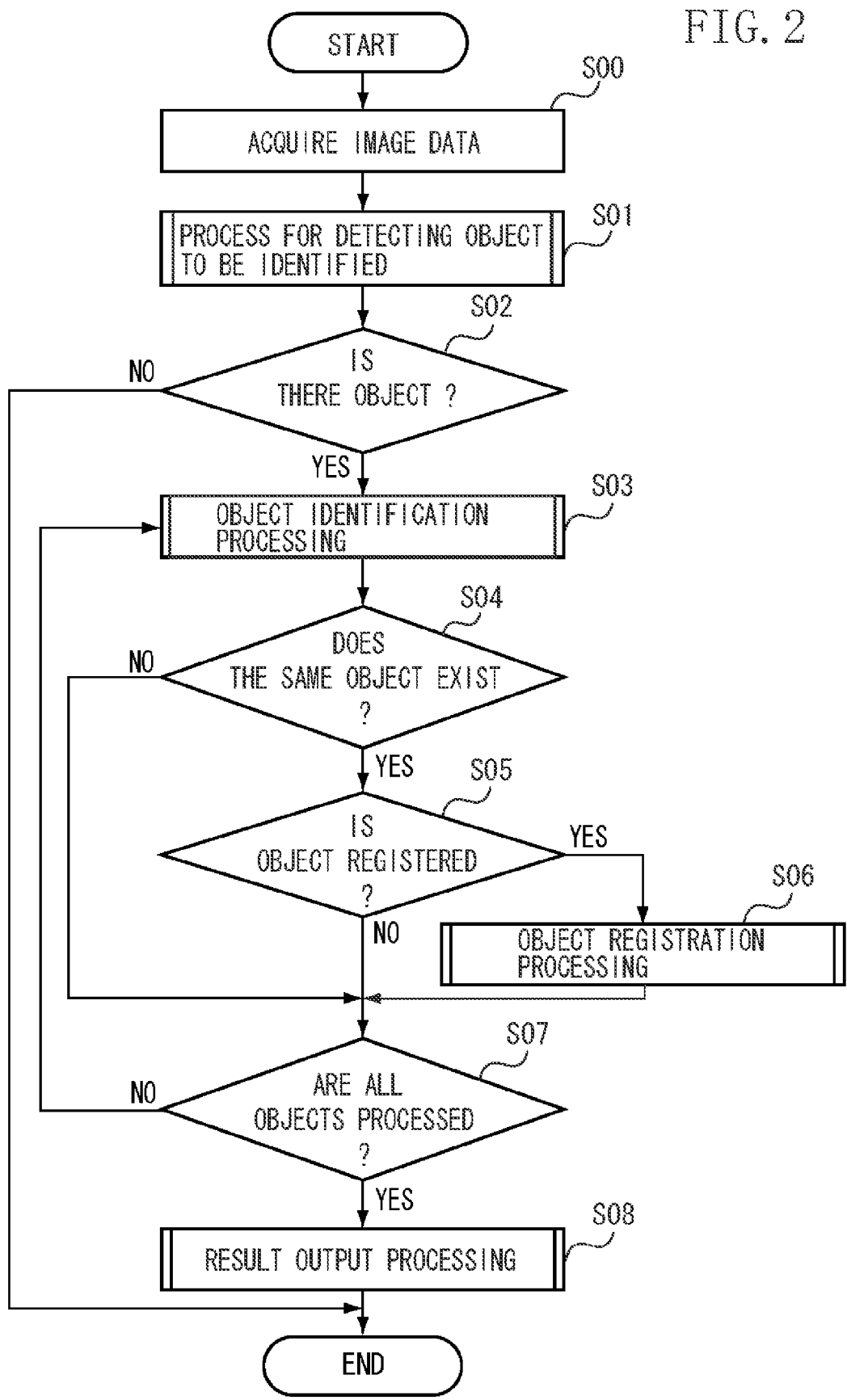
FIG. 2 is a flow chart illustrating an example of entire processing of the object identification apparatus.

FIG. 2 is a flow chart illustrating an example of the entire processing of the object identification apparatus 100. Referring to FIG. 2, an actual processing is described in which the object identification apparatus 100 identifies an object from an image. Although a case in which an object to be identified is a human face is described here, the present exemplary embodiment is not limited to the human face.

In step S00, the object identification unit 6 acquires image data (input of image data) from the image recording unit 4. In step S01, the object identification unit 6 performs processing for detecting a human face on the acquired image data. A known technique may be used as a method of detecting a human face from an image. The object identification unit 6 may use such a technique as discussed in Japanese Patent Publication No. 3078166 and Japanese Patent Application Laid-Open No. 2002-8032, for example.

The processing for detecting a human face (i.e., an object) to be identified is performed. After that, if a human face exists in the image (YES in step S02), in step S03, the object identification unit 6 performs an object identification processing, i.e., an identification processing for an individual. If a human face does not exist in the image (NO in step S02), the object identification unit 6 ends the processing illustrated in FIG. 2. The object identification processing in step S03 is described in detail below.

In step S04, the object identification unit 6 determines, based on the result of the object identification processing, whether there is a face corresponding to the registered face of a person. If the same face as the face detected in step S01 exists in the registered face (YES in step S04), the processing proceeds to step S07. If the detected face does not coincide with any of the registered faces (NO in step S04), in step S05, the object identification unit 6 determines whether the face is registered. Although the above processing may be previously set, a user, for example, may determine whether the face is registered there through an external interface or a GUI.

If the object identification unit 6 determines that the face is registered (YES in step S05), in step S06, the object registration unit 5 performs an object (human face) registration processing described below. If the object identification unit 6 determines that the face is not registered (NO in step S05), the object identification unit 6 continues the processing. After the object registration processing is performed in step S06 and if the face is not registered in step S05, in step S07, the object identification unit 6 determines whether all the detected objects are processed.

If there are objects yet to be processed (NO in step S07), the processing returns to step S03. If all the detected objects are processed (YES in step S07), in step S08, the object identification unit 6 outputs the results of a series of the object identification processing to the external output unit 7. There is described above the entire process flow of the object identification apparatus 100 according to the present exemplary embodiment.

Figure 3:
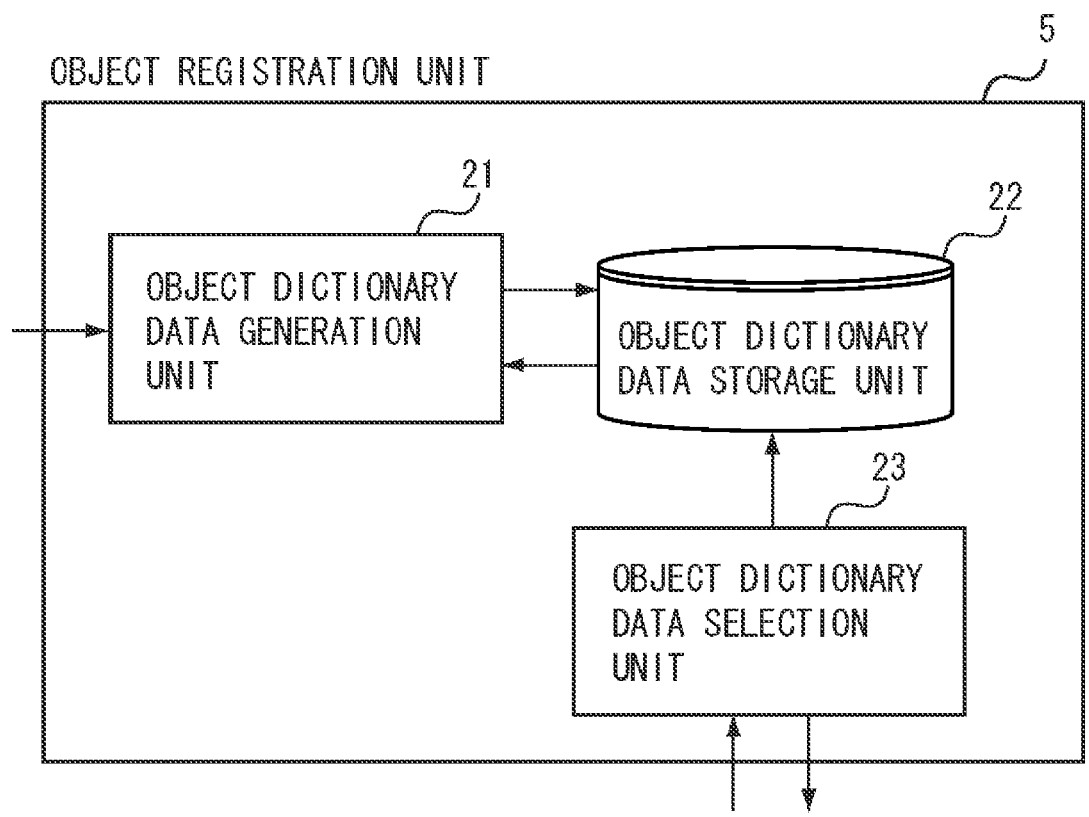
FIG. 3 is a block diagram illustrating an example configuration of an object registration unit.

The object registration processing is described below. FIG. 3 is a block diagram illustrating an example configuration of the object registration unit 5. As illustrated in FIG. 3, the object registration unit 5 includes an object dictionary data generation unit 21, an object dictionary data storage unit 22, and an object dictionary data selection unit 23.

The object dictionary data generation unit 21 generates object dictionary data required to identify the individual of an object from the image data acquired from the image recording unit 4. The object dictionary data generation unit 21 may typically use a human facial image as dictionary data when two-class issues of intra- and extra-class are discriminated as described above, for example. The object dictionary data generation unit 21 normalizes the size and orientation (in-plane rotational direction) of the image data of the object detected by the object detection processing and then may store the image data in the object dictionary data storage unit 22.

The object dictionary data generation unit 21 may reduce the amount of dictionary data by storing not image data itself but only data required for identification. When an identification calculation is performed by vector correlation in a local area of the object, the object dictionary data generation unit 21 may previously cut out only the local area.

Thus, the object dictionary data generation unit 21 extracts required information from an image as needed, performs a predetermined conversion of the information described below, and stores it in the object dictionary data storage unit 22 as a feature vector for identifying an object. The content of a specific processing carried out in the object dictionary data generation unit 21 is described in detail below.

The object dictionary data selection unit 23 reads necessary object dictionary data from the object dictionary data storage unit 22 in response to the request of the object identification unit 6 and transfers the object dictionary data to the object identification unit 6.

Figure 4:
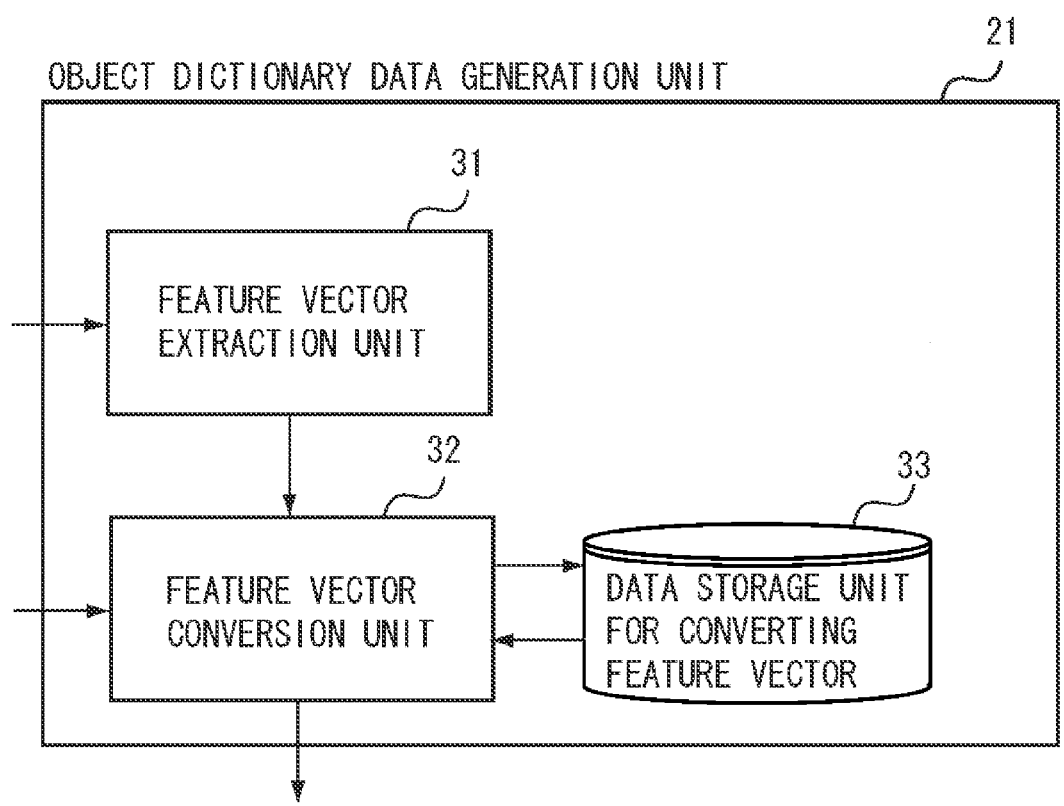
FIG. 4 is a block diagram illustrating an example configuration of an object dictionary data generation unit.

FIG. 4 is a block diagram illustrating an example configuration of the object dictionary data generation unit 21. As illustrated in FIG. 4, the object dictionary data generation unit 21 includes a feature vector extraction unit 31, a feature vector conversion unit 32, and a data storage unit for converting a feature vector 33.

The feature vector extraction unit 31 extracts a feature vector from object data for registration. If an object is a human face, the feature vector extraction unit 31 typically performs processing for extracting data required for identification from an image including a face. The feature vector extraction unit 31 can extract data required for identification from a predetermined partial area of the face with its luminance value as a feature vector.

More specifically, the feature vector extraction unit 31 can operate as described below. The feature vector extraction unit 31 detects the end points of components such as an eye, mouth, nose, and the like from a facial image. A method using a convolutional neural network discussed in Japanese Patent Publication No. 3078166, for example, may be used as algorithm for detecting the end points.

The feature vector extraction unit 31 detects the end point and then acquires a luminance value in the predetermined area as a feature vector using the end point as a reference. The size of areas is optional. Typically, for one end point of one portion, the endpoint and several points around the end point may be used as an area. Parts of face expressing individual characteristic such as left and right eyes, a mouth, and a nose are previously determined as the portions. The feature vector extraction unit 31 may extract a feature vector from the result of filter calculation by a Gabor filter or the like instead of directly acquiring a luminance value.

The number and the position of the aforementioned partial areas may be previously determined by using a method of machine learning. For example, the feature vector extraction unit 31 may set a plurality of candidates for partial areas to select a partial area from among the plurality of candidates using AdaBoost. A method of actually determining a partial area using AdaBoost will be described in detail in the description of the object identification unit 6.

The feature vector extraction unit 31 may perform sub-sampling in extracting a feature vector. The term "sub-sampling" refers to the extraction of a feature vector while thinning luminance values from the predetermined partial area with respect to pixels in extracting a feature vector from a luminance value of an image including a face. This allows producing a feature vector without significantly increasing the dimension of the feature vector with respect to a wide partial area to a certain extent and brings about an effect of being robust to noises such as shadow.

The simplest sub-sampling is performed in such a manner that one pixel is skipped. Alternatively, the amount of skipping may be varied in the vertical and the horizontal direction. The feature vector extraction unit 31 may change the sub-sampling method for each partial area. The feature vector extraction unit 31 may use a method of machine learning to set a sub-sampling method for a partial area. The method of machine learning is not described because it is similar in method to the selection of the above partial area.

The feature vector conversion unit 32 performs conversion of the feature vector extracted by the feature vector extraction unit 31. The conversion of the feature vector is performed by using dimension compression by principal component analysis (PCA) or by independent component analysis (ICA), for example. The feature vector conversion unit 32 may perform the dimension compression using Fisher discriminant analysis (FDA).

When the feature vector conversion unit 32 uses PCA for the feature vector conversion method, the number of bases (or the number of reduction in dimensions of feature vector) and parameters as to which base is used are used. The feature vector conversion unit 32 may use the sum of characteristic values corresponding to a basic vector or a cumulative contribution ratio as an index instead of the number of bases. The feature vector conversion unit 32 can make the parameters different for each partial area. A previous machine learning allows determination of what parameter should be actually set.

The object identification unit 6 can perform conversion of a feature vector different for each partial area. Setting information as to what conversion should be applied to which partial area may be acquired from the data storage unit for converting a feature vector 33. As described above, the feature vector conversion unit 32 stores data to which the feature vector is converted in the object dictionary data storage unit 22 as the output of the object dictionary data.

The data storage unit for converting a feature vector 33 stores data required in converting the feature vector in the feature vector conversion unit 32. The term "data required for the conversion of the feature vector" refers to setting information as to what conversion should be performed for each partial area, as described above, and the following information required for the actual conversion.

When the dimension compression by principal component analysis (PCA) is used for the conversion to be carried out in the feature vector conversion unit 32, a characteristic vector of variance-covariance matrix is contained therein. When the dimension compression by independent component analysis (ICA) is used, a basic vector of an independent component is contained therein. As described later, the conversion of a feature vector different for each partial area may be applied in the object identification unit 6, so that conversion data required for each partial area is stored in the data storage unit for converting a feature vector 33.

Figure 5:
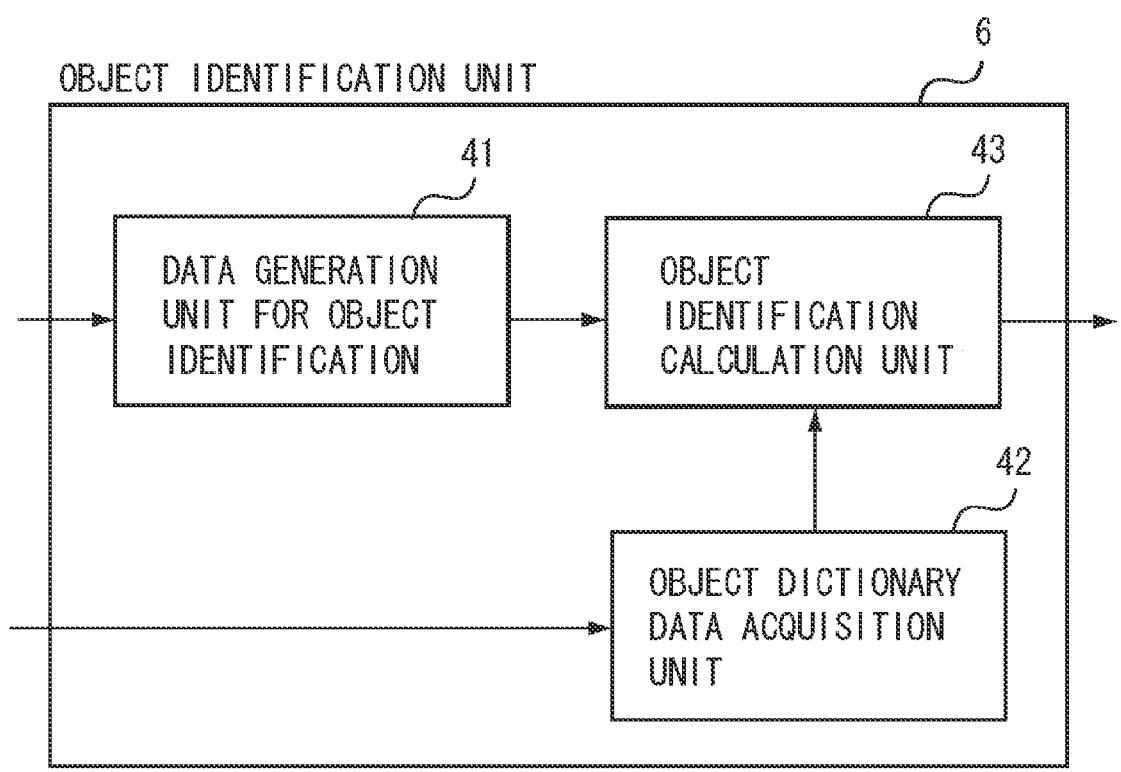
FIG. 5 is a block diagram illustrating an example configuration of an object identification unit.

Next, The object identification processing is described. FIG. 5 is a block diagram illustrating an example configuration of the object identification unit 6. As illustrated in FIG. 5, the object identification unit 6 includes a data generation unit for object identification 41, an object dictionary data acquisition unit 42, and an object identification calculation unit 43.

The data generation unit for object identification 41 extracts information required for identifying an object from the image data acquired from the image recording unit 4. The object dictionary data acquisition unit 42 acquires dictionary data required for identifying an object from the object registration unit 5. The object identification calculation unit 43 performs the object identification processing based on the identification data acquired from the data generation unit for object identification 41 and the dictionary data acquired from the object dictionary data acquisition unit 42. The processing carried out here is described in detail below.

Figure 6:
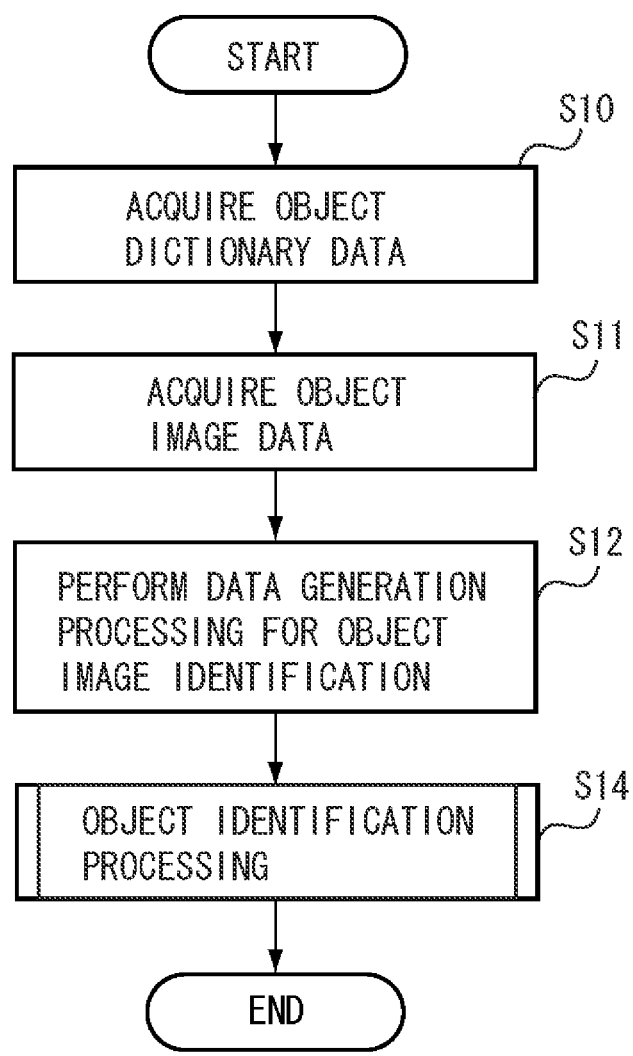
FIG. 6 is a flow chart illustrating an example of the identification processing carried out in the object identification unit.

FIG. 6 is a flow chart illustrating an example of the identification processing carried out in the object identification unit 6.

In step S10, the object identification unit 6 acquires object dictionary data from the object registration unit 5. In step S11, the object identification unit 6 acquires object image data from the image recording unit 4. In step S12, the object identification unit 6 performs data generation processing for object identification. The processing carried out here is described in detail below.

In step S14, the object identification unit 6 performs an object identification calculation processing. The coincidence of image data with the registered data (dictionary data) may be output in a binary (0 or 1) or in a normalized output value (real numbers of 0 to 1) as the output of the object identification calculation processing. If the number of registered objects (registrations) is plural, the output value may be output to each registered object (registration) or only the registered data most coincident may be output. The content of the object identification calculation processing is described in detail later. There is described above an example of the processing flow of the object identification unit 6.

Figure 7:
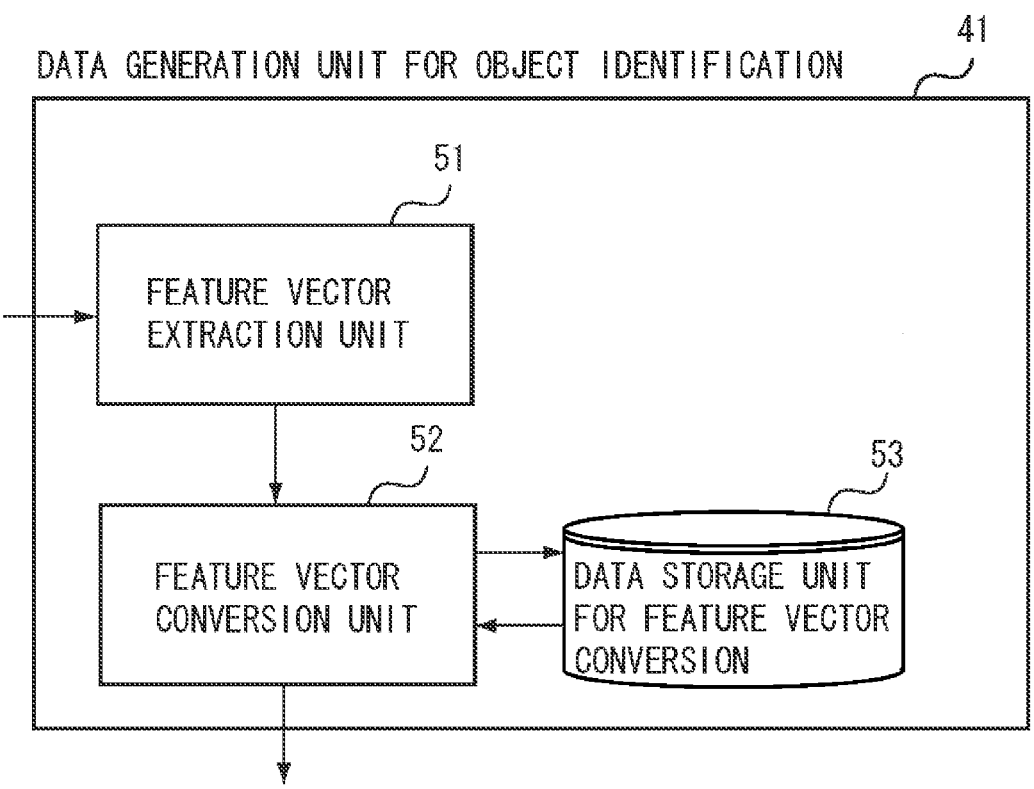
FIG. 7 is a block diagram illustrating an example configuration of the data generation unit for object identification.

FIG. 7 is a block diagram illustrating an example configuration of the data generation unit for object identification 41. As illustrated in FIG. 7, the data generation unit for object identification 41 includes a feature vector extraction unit 51, a feature vector conversion unit 52, and a data storage unit for feature vector conversion 53. The configuration of the data generation unit for object identification 41 and the processing carried out therein are substantially similar to those in the object dictionary data generation unit 21, the detailed description thereof is omitted.

Methods for converting a feature vector for each partial area need to coincide with each other between the object dictionary data generation unit 21 and the data generation unit for object identification 41. The method for converting a feature vector may be different for each partial area. Therefore, if the conversion methods do not coincide with each other in both units, the processing different for each partial area needs to be performed in the object identification processing described later.

Although it is possible to configure such an identification unit (using data in which feature vectors different between registration and identification are converted as an input), it is generally desirable that both coincide with each other. Also, when the feature vector extraction unit 51 performs sub-sampling, the settings of the sub-sampling desirably coincide with each other between both.

Figure 8:
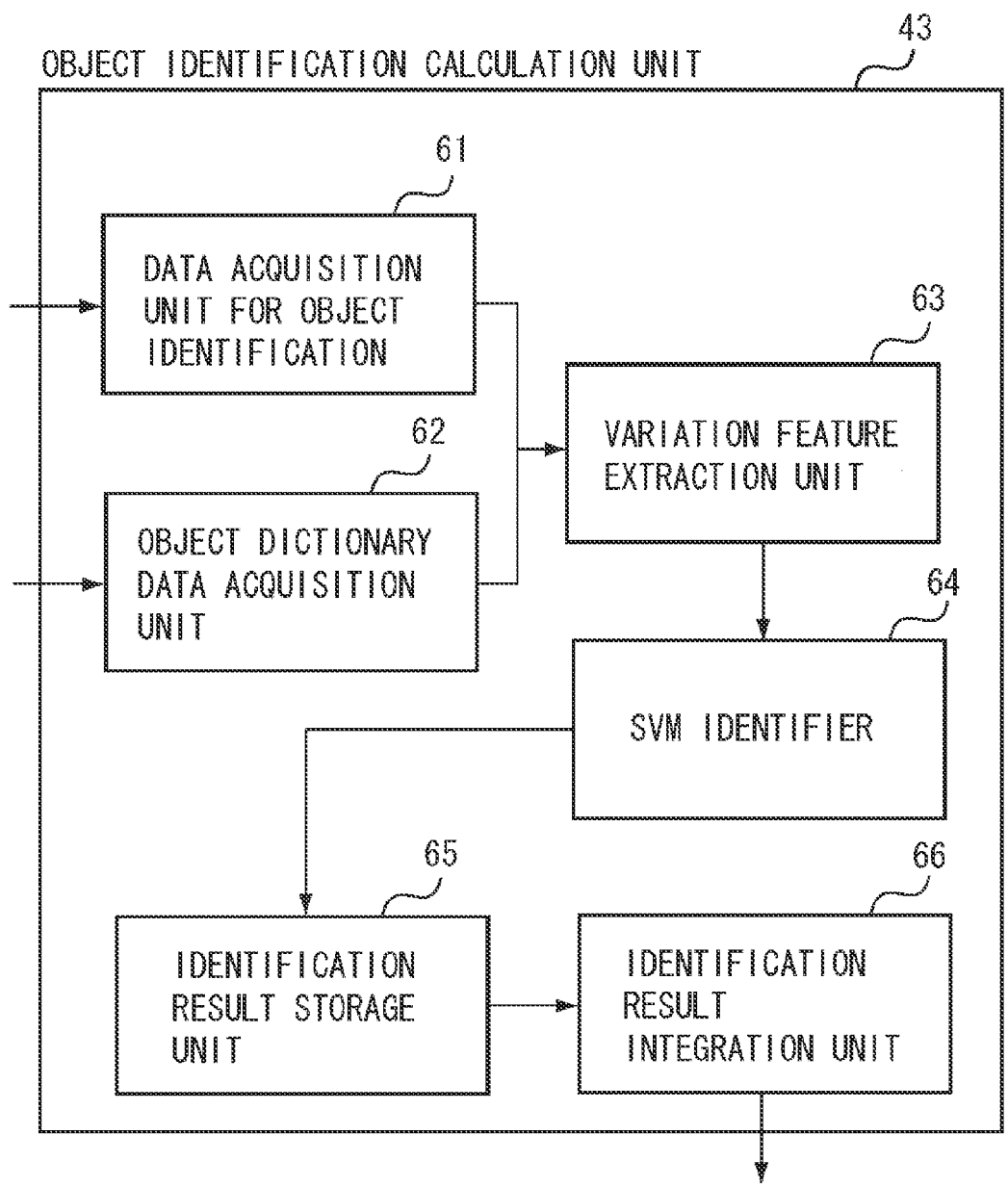
FIG. 8 is a block diagram illustrating an example configuration of an object identification calculation unit.

Next, the object identification calculation processing is described. An example, in which two-class issues of the intra-class and the extra-class are determined using the SVM identifier, is described below. FIG. 8 is a block diagram illustrating an example configuration of the object identification calculation unit 43. The object identification calculation unit 43 includes a data acquisition unit for object identification 61, an object dictionary data acquisition unit 62, a variation feature extraction unit 63, an SVM identifier 64, an identification result storage unit 65, and an identification result integration unit 66.

Figure 9:
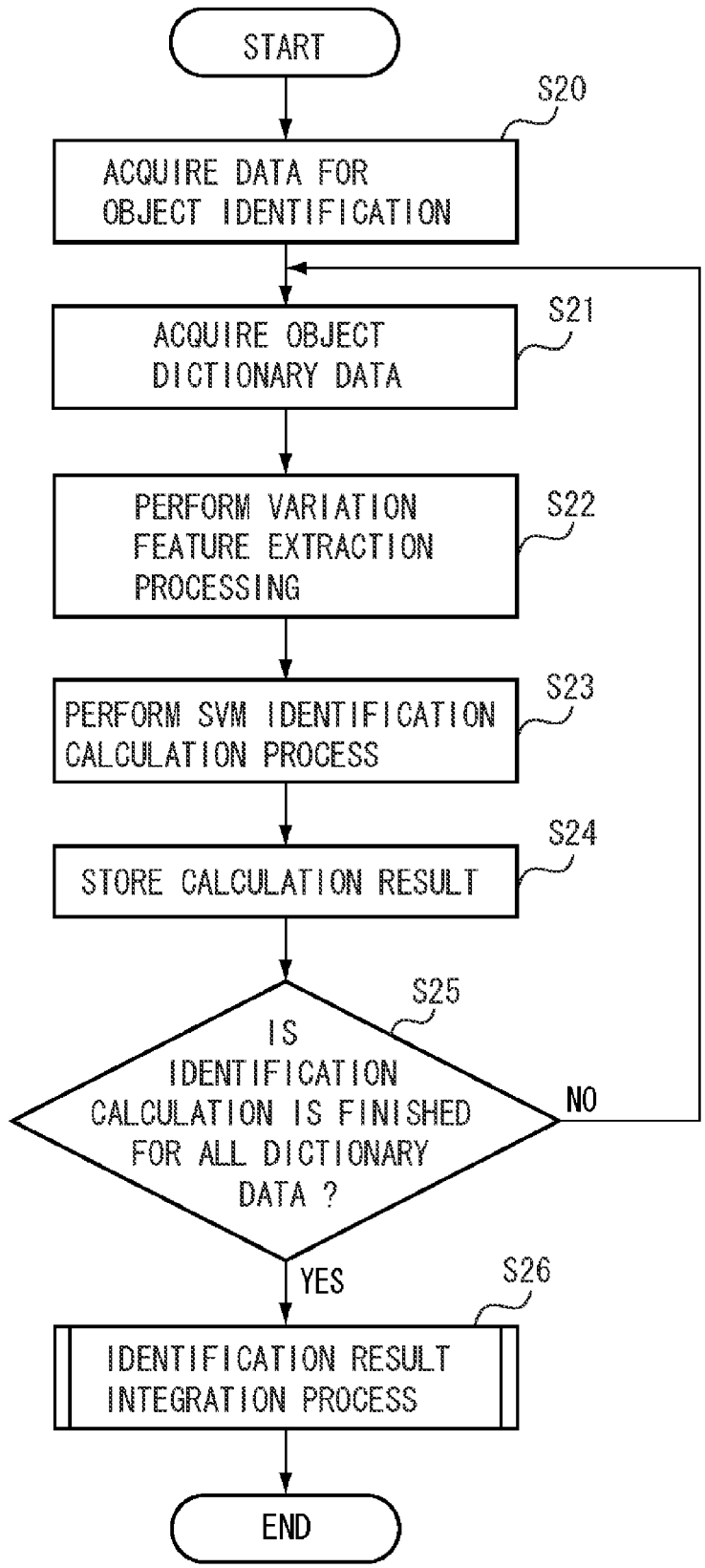
FIG. 9 is a flow chart illustrating an example of object identification calculation processing.

FIG. 9 is a flow chart illustrating an example of the object identification calculation processing. The object identification calculation processing is described below with reference to FIG. 9.

In step S20, the data acquisition unit for object identification 61 acquires data for object identification. In step S21, the object dictionary data acquisition unit 62 acquires object dictionary data. In step S22, the variation feature extraction unit 63 performs a variation feature extraction processing using the data for object identification and the object dictionary data acquired in steps S20 and S21 respectively.

The term "variation feature" refers to feature belonging to any of variation between the same objects or variation between different objects typically extracted from two images. The variation feature is diversely defined. As an example, a vector, in which a correlation value (inner product) is calculated by the dictionary data and the data for identification between the feature vectors corresponding to the same area and the correlation value is taken as a component, is taken as a variation feature vector. According to the above definition, the number of dimension of the variation feature vector coincides with that of partial areas.

In step S23, the variation feature extraction unit 63 inputs the variation feature vector acquired in step S22 to a support vector machine (SVM) identifier 64. The SVM identifier 64 is previously trained as an identifier for identifying two classes of the variation between the same objects (intra-class) and the variation between the different objects (extra-class).

In general, the increase of the number of partial areas proportionally increases the number of dimension of the variation feature vector to increase calculation time. For this reason, if processing time is prioritized, it is effective to use a cascade-connection SVM identifier. In this case, the SVM identifier is formed of components trained for each partial area. The variation feature extraction unit 63 divides the variation feature vector for each partial area and inputs it to the corresponding SVM identifier.

Thus, calculation time can be reduced. The SVM identifier may not be made to learn with the SVM identifier associated only with one partial area, but to learn with the combination of two or more partial areas as an input to the SVM identifier.

When importance is placed on identification accuracy, the SVM identifier may be calculated in parallel and the weighted sum of the calculation result may be formed. In this case, also the application of algorithm for reducing the number of support vectors enables reducing calculation time to some extent. The following technique may be used to reduce the number of support vectors: "Burges, C. J. C. (1996), 'Simplified Support Vector Decision Rules,' International Conference on Machine Learning (pp. 71-77)."

In step S24, the result of identification between the dictionary data and the data for object identification calculated in step S23 is stored in the identification result storage unit 65. In step S25, it is determined whether the identification calculation for all the dictionary data is finished. If the dictionary data yet to be calculated still remains (NO in step S25), the processing returns to step S21. If the identification calculation for all the dictionary data is finished (YES in step S25), then in step S26, the identification result integration unit 66 performs an identification result integration processing.

The identification result integration processing is carried out in such a manner that, speaking in the simplest terms, if the SVM identifier is an identifier for outputting a regression value, for example, the identification result integration unit 66 outputs the dictionary data that is highest in value as an identification result. The identification result integration unit 66 may output a list of result of high-ranking objects that are high in coincidence rate. There is described above the object identification calculation processing.

Steps are described below in which AdaBoost is used for learning of combining the partial area with the feature vector conversion method.

Figure 10:
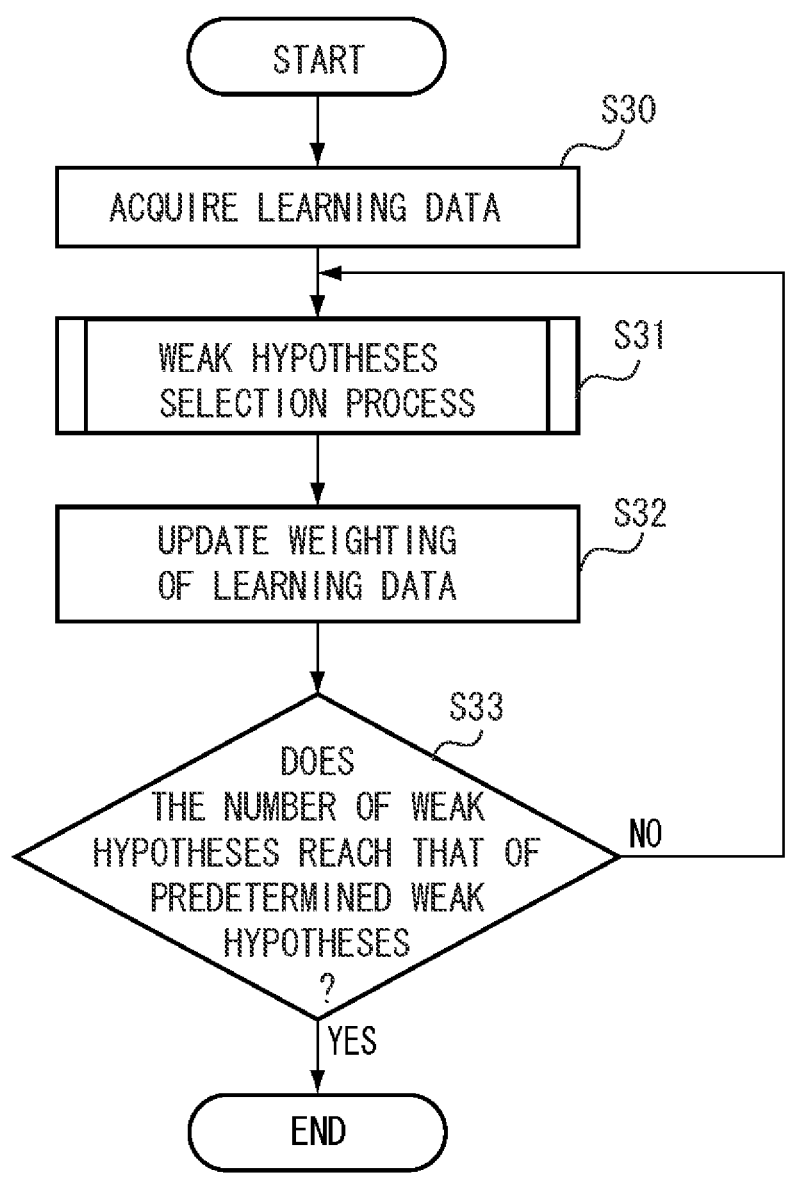
FIG. 10 is a flow chart illustrating example learning processing of a partial area.

FIG. 10 is a flow chart illustrating an example of learning processing of a partial area. In step S30, the object identification apparatus 100 acquires learning data. If a human face is processed, there is prepared a large number of images including faces with labels representing an individual identifier. In this case, it is desirable to prepare a sufficient number of images per person.

In order to learn a partial area that is robust to variation in illumination and expression and a method of converting a feature vector, it is important to prepare samples in which learning data sufficiently include the above variation. Two kinds of data expressing the variation of an individual face and variation with another individual face can be generated from the facial images with labels.

In step S31, the object identification apparatus 100 performs the selection processing of weak hypothesis. The term "weak hypothesis" typically refers to the combination of a partial area and a method for converting a feature vector. All possible combinations of candidates of face partial areas and methods of converting a feature vector need to be previously prepared. In step S32, the object identification apparatus 100 selects the weak hypothesis that is best in performance, i.e., the combination of a partial area and a method for converting a feature vector, for the leaning data acquired in step S30 according to the framework of AdaBoost.

Specific steps for evaluating performances may be performed according to the example of the variation feature extraction processing described in the description of the object identification calculation unit 43. In other words, the object identification apparatus 100 determines the correlation value (inner product) of a feature vector with respect to learning data to generate a variation feature vector and inputs it to the SVM identifier. The object identification apparatus 100 determines whether correct identification results are acquired between persons with the same label (images are different) and between persons with a different label respectively to acquire the weighted error rate of learning data.

If the weak hypothesis that is best in performance is selected, in step S32, the object identification apparatus 100 updates the weighting of the learning data based on an identification result related to the learning data of the weak hypothesis. In step S33, the object identification apparatus 100 determines whether the number of the weak hypotheses reaches the predetermined number of the weak hypotheses. If the number of the weak hypotheses reaches the predetermined number of the weak hypotheses (YES in step S33), the object identification apparatus 100 ends the learning processing. If the number of the weak hypotheses does not reach the predetermined number of the weak hypotheses (NO in step S33), the object identification apparatus 100 selects a new weak hypothesis.

It is useful to refer to "Viola & Jones (2001), 'Rapid Object Detection Using a Boosted Cascade of Simple Features,' Computer Vision and Pattern Recognition" to know the detailed steps for learning using Adaboost, such as the calculation of the weighted error rate and a method of updating the weighting of the learning data.

The object identification apparatus 100 may form the weak hypothesis by combining a plurality of partial areas with a method for converting a feature vector. In other words, the object identification apparatus 100 makes the number of partial areas included in one weak hypothesis constant (five, ten, and others, for example).

In this case, the increase of the number of partial areas in one weak hypothesis exponentially increases the number of combinations, so that it is recommended to learn with constraint conditions attached. More specifically, the object identification apparatus 100 precludes partial areas close to each other from being included with reference to positional relationships between partial areas.

Furthermore, the object identification apparatus 100 may use an optimization method such as genetic algorithm (GA) in combining the plurality of partial areas. In this case, the object identification apparatus 100 dynamically constructs candidates for weak hypotheses while selecting weak hypotheses instead of previously preparing all the candidates for weak hypotheses before starting procedures for AdaBoost.

In other words, the object identification apparatus 100 selects the candidates good in performance from among partial candidates for weak hypotheses previously prepared (for example, formed by randomly combining candidates of areas). The object identification apparatus 100 generates new candidates for weak hypotheses while combining candidates good in performance with each other and evaluates their performances. This allows efficiently narrowing down the candidates for weak hypotheses. Thereby, an increase in learning time can be suppressed. There is described above the procedure for learning a combination of the partial area and the method of converting a feature vector.

A second exemplary embodiment is different from the first exemplary embodiment in processing performed in the object registration unit 5 and the object identification unit 6. In the first exemplary embodiment, the method for converting a feature vector for each partial area is previously determined off-line. The present exemplary embodiment, on the other hand, is different from the first exemplary embodiment in that the method of converting a feature vector for each partial area is selected based on some criteria in identification and applied. In the present exemplary embodiment, the configuration of the object registration unit 5 and the object identification unit 6 is partially different from that of the first exemplary embodiment.

The second exemplary embodiment is described further in detail below. The portions similar to those of the first exemplary embodiment are not described to avoid duplication in the following description.

Figure 11:
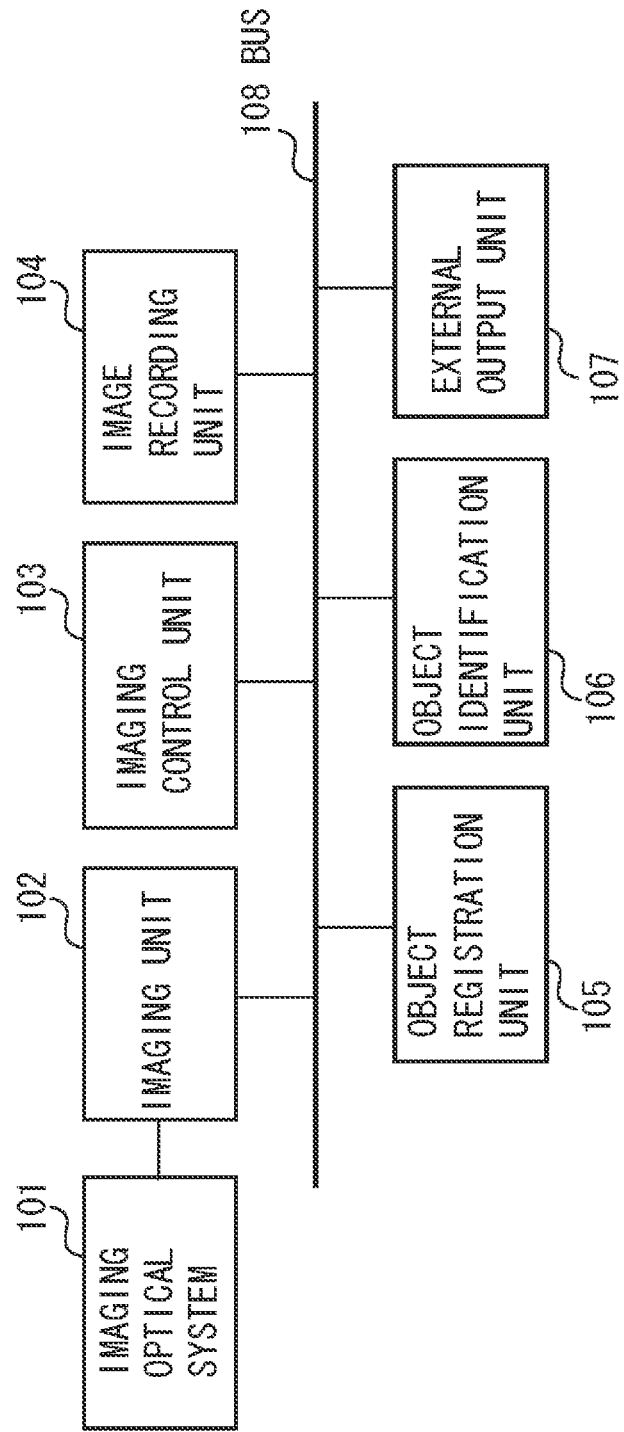
FIG. 11 is a block diagram illustrating an example configuration of the object identification apparatus.

FIG. 11 is a block diagram illustrating an example configuration of the object identification apparatus 100. The basic function of each unit is similar to that in the first exemplary embodiment. For the convenience of description, although an object to be identified is a human face in an image, the present exemplary embodiment can be applied to other objects as well as the human face.

Figure 12:
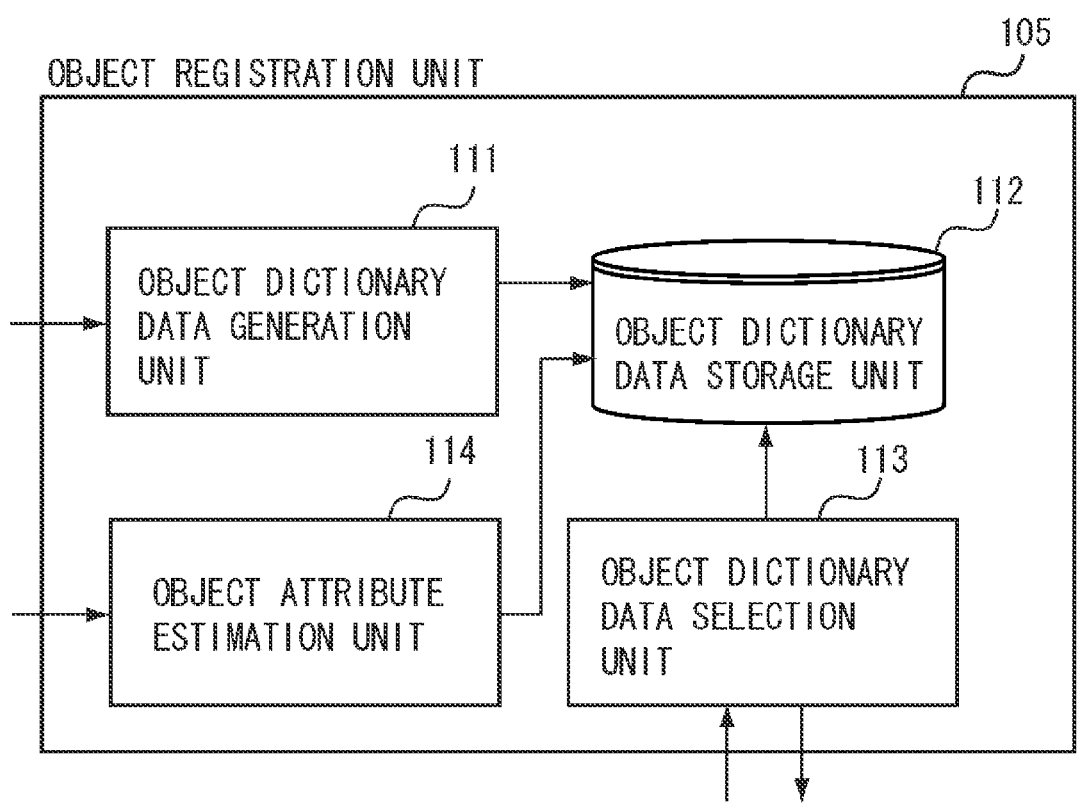
FIG. 12 is a block diagram illustrating an example configuration of an object registration unit.

FIG. 12 is a block diagram illustrating an example configuration of the object registration unit 105. The object registration unit 105 includes an object dictionary data generation unit 111, an object dictionary data storage unit 112, an object dictionary data selection unit 113, and an object attribute estimation unit 114. The object registration unit of the present exemplary embodiment is different from that of the first exemplary embodiment in that the object attribute estimation unit 114 is added.

The object attribute estimation unit 114 estimates the attribute of an object based on image information input from the image recording unit 104. Specific attributes estimated by the object attribute estimation unit 114 include the size, attitude and orientation of an object, and an illumination condition.

If an object is a person, the object attribute estimation unit 114 may estimate attributes such as the age, sex, expression, and the like of the person. The object attribute estimation unit 114 can use a known technique to estimate these attributes. The use of a technique discussed in Japanese Patent Application Laid-Open No. 2003-242486, for example, enables the object attribute estimation unit 114 to estimate human attributes.

The object attribute estimation unit 114 may use a camera parameter as an example of imaging parameters to estimate attributes. The object attribute estimation unit 114 can accurately estimate the attributes of illumination condition and the like by acquiring parameters related to automatic exposure (AE) and automatic focus (AF) for control, for example, from the imaging control unit 103.

Specific examples of camera parameters include exposing condition, white balance, focus, and size of object. For example, the object identification apparatus 100 previously creates a list for associating exposing condition and white balance with a color component corresponding to a skin color component area and stores the list as a lookup table, thereby allowing the estimation of the color attribute of an object independent of image shooting condition.

The object attribute estimation unit 114 can measure a distance to an object using a distance measurement unit such as an AF to enable estimation of the size of the object. More specifically, the object attribute estimation unit 114 can estimate the size of the object according to the following equation.

$$s = (f/d - f) \cdot S$$

where, s is the size of an object on an image (the number of pixels), f is a focal distance, d is a distance from an apparatus to an object, and S is an actual size of the object. Further, d is greater than f (d>f). Thus, the size of an object can be estimated independently from shooting condition as an attribute.

The attribute information of the object estimated by the object attribute estimation unit 114 is stored in the object dictionary data storage unit 112 along with object dictionary data output from the object dictionary data generation unit 111.

The processing in the object dictionary data generation unit 111 is partly different from that in the first exemplary embodiment. The object dictionary data generation unit 21 in the first exemplary embodiment extracts a feature vector from the partial area predetermined as dictionary data and applies the predetermined conversion method thereto. On the other hand, in the object dictionary data generation unit 111 of the present exemplary embodiment, a conversion method to a feature vector is not previously determined. The conversion method is dynamically determined in identification by an object identification unit described below.

Therefore, the object dictionary data generation unit 111 provides all the prepared conversion methods for the feature vector, thereby, allowing reducing a processing time consumed for feature-vector conversion in authentication. There is described above the object registration unit 105.

Figure 13:
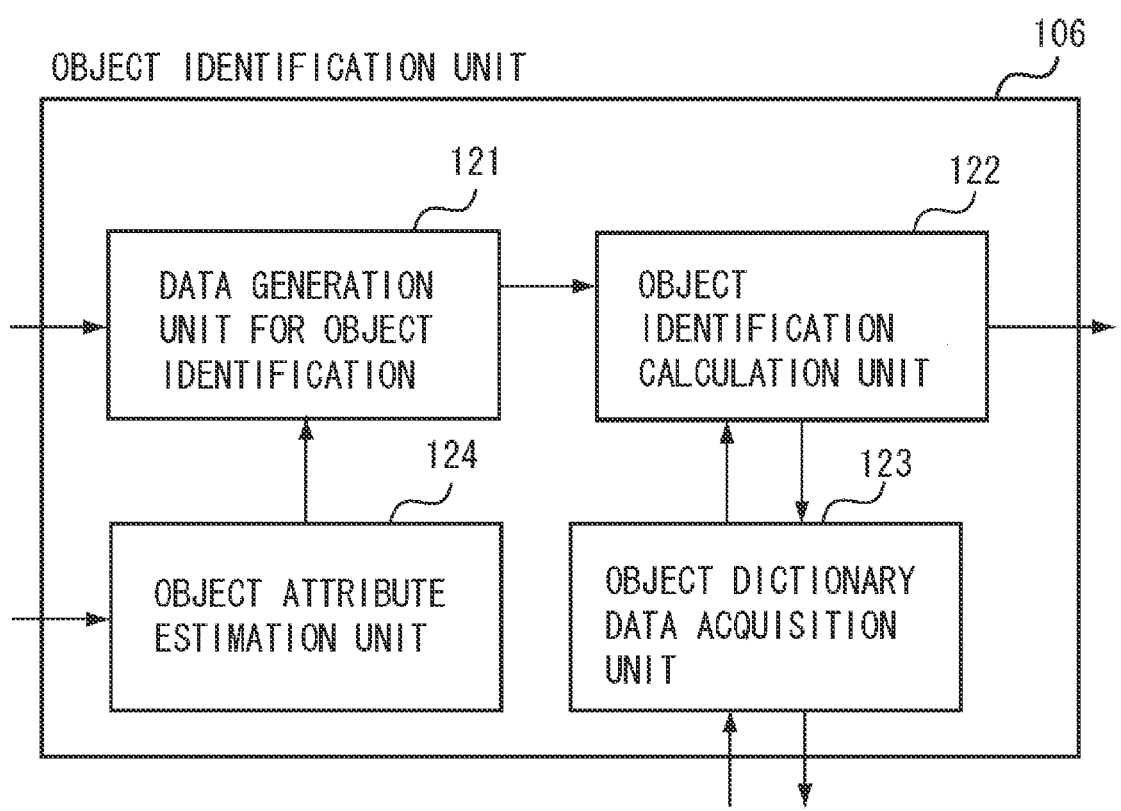
FIG. 13 is a block diagram illustrating an example configuration of an object identification unit.

FIG. 13 is a block diagram illustrating an example configuration of an object identification unit 106. The object identification unit 106 includes a data generation unit for object identification 121, an object identification calculation unit 122, an object dictionary data acquisition unit 123, and an object attribute estimation unit 124. The object identification unit of the present exemplary embodiment is different from that of the first exemplary embodiment in that the object attribute estimation unit 124 is added. The object attribute estimation 124 is similar to the object attribute estimation unit 114 of the object registration unit 105 in the processing, so that description thereof is omitted.

The data generation unit for object identification 121 receives an input from the image recording unit 104, extracts a feature vector, and/or converts it using the output of the object attribute estimation unit 114. The specific processing performed in the data generation unit for object identification 121 are described in detail below.

The object identification calculation unit 122 identifies an object based on the outputs from the data generation unit for object identification 121 and the object dictionary data acquisition unit 123. The specific processing performed in the object identification calculation unit 122 are described in detail later.

The object dictionary data acquisition unit 123 acquires object dictionary data from the object dictionary data storage unit 112 in the object registration unit 105 based on a request from the object identification calculation unit 122.

Figure 14:
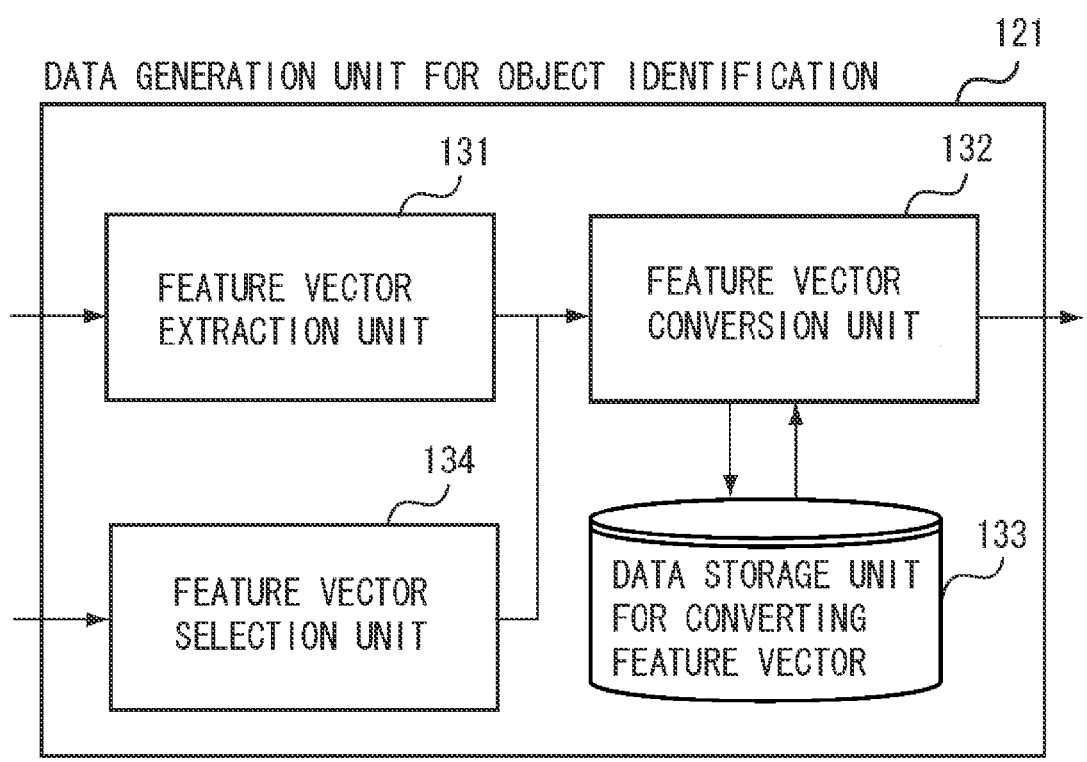
FIG. 14 is a block diagram illustrating an example configuration of a data generation unit for object identification.

FIG. 14 is a block diagram illustrating an example configuration of the data generation unit for object identification 121. The data generation unit for object identification 121 includes a feature vector extraction unit 131, a feature vector conversion unit 132, a data storage unit for feature vector conversion 133, and a feature vector conversion-method selection unit 134. The data generation unit for object identification of the present exemplary embodiment is different from that of the first exemplary embodiment in that the feature vector conversion-method selection unit 134 is added.

The feature vector conversion-method selection unit 134 selects a method for converting a feature vector and parameters thereof and outputs them to the feature vector conversion unit 132 based on information from the object attribute estimation unit 124.

Figure 15:
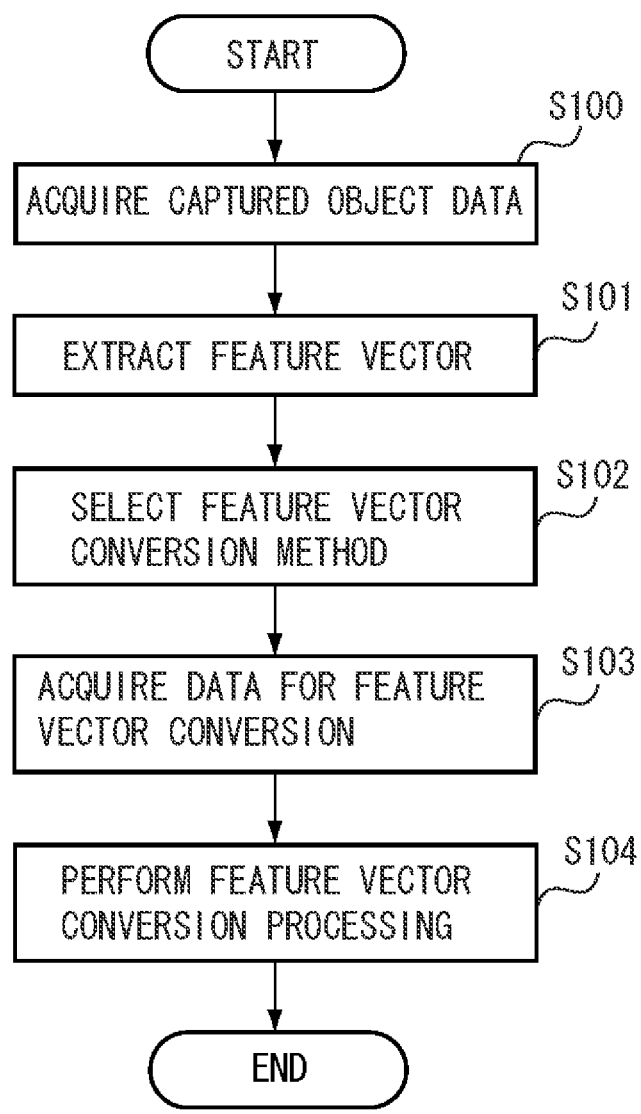
FIG. 15 is a flow chart illustrating example processing performed in the data generation unit for object identification.

FIG. 15 is a flow chart illustrating an example of the processing performed in the data generation unit for object identification 121. In step S100, the data generation unit for object identification 121 acquires a captured object data from the image recording unit 104.

In step S101, the data generation unit for object identification 121 extracts a feature vector. A method for extracting a feature vector and the specific processing performed therein are similar to those in the first exemplary embodiment, so that description thereof is omitted.

In step S102, the data generation unit for object identification 121 selects a feature vector conversion method based on the attribute information of an object acquired from the object attribute estimation unit 124. A lookup table (LUT) may be used for selecting the feature vector conversion method.

FIG. 16 illustrates an example of the LUT illustrating the correspondence of the attribute information of an object to the feature vector conversion method. If the attribute of an object is a human face, for example, the most suitable feature vector conversion method is previously set for each partial area under the conditions of illumination condition, orientation of a face, and expression thereof. The LUT contains parameters for the conversion method. The data generation unit for object identification 121 may refer to camera parameters such as AE and AF as well as attribute information.

A large number of samples are previously surveyed and performances thereof are evaluated to set suitable conversion methods for each partial area. This may be surveyed by using machine learning. For example, the AdaBoost method described in the first exemplary embodiment is used to determine the best suited conversion method. In this case, the partial area and the combination of the attributes of an object, camera parameters, conversion methods, and parameters of the conversion methods correspond to weak hypothesis.

As a method for selecting the feature vector conversion method, the support vector machine (SVM) can be used. The SVM for outputting the combination of the feature vector conversion method and the parameters thereof may be used with partial area, attribute information of an object, and camera parameters as inputs. A selector for selecting a feature vector conversion method using the SVM is constructed such that the learning of the SVM is performed with a combination of the result for estimating the attributes of an object and the conversion method that is regarded as most suitable and whose performances are previously surveyed as supervised data.

A feature vector conversion method can be selected by hierarchically arranging the SVM. In this case, the output of the object attribute estimation unit 124 is previously categorized to learn the SVM. Specifically, there is prepared a plurality of SVMs such as an SVM specialized in attributes related to the size, tilt and shape of an object and an SVM specialized in attributes related to texture such as the reflection of color and illumination and the output (regression value) of each SVM may be taken as the input of the following hierarchical SVM.

In step S103, the data generation unit for object identification 121 acquires data required for converting a feature vector based on information on the selected feature vector conversion method. In step S104, the data generation unit for object identification 121 converts the feature vector and outputs it to the object identification calculation unit 122. There is described above the data generation unit for object identification 121.

The object identification calculation processing is described below. The entire processing of the object identification calculation is substantially similar to that in the first exemplary embodiment. The processing of the object identification calculation in the present exemplary embodiment is different from the first exemplary embodiment in that a feature vector processed by the same method is obtained for each partial area with reference to the output of the data generation unit for object identification 121 in obtaining an object identification data.

Described below is a case where an object identifier in which a large number of identifiers (hereinafter, referred to as a weak identifier) is structured in a tree shape is used to perform the object identification processing. Although the weak identifier typically corresponds to one partial area, the weak identifier may correspond to a plurality of partial areas.

Figure 17:
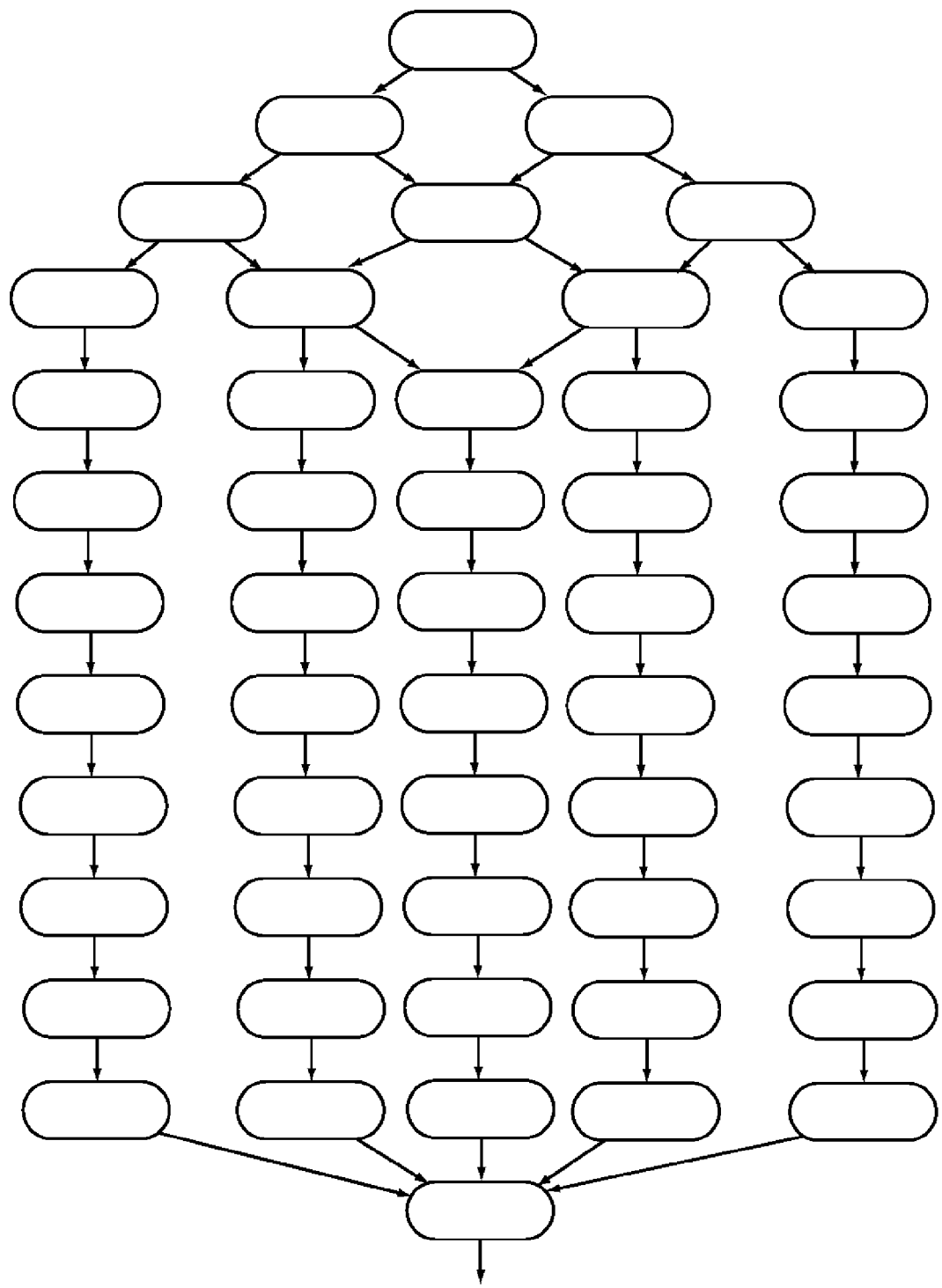
FIG. 17 is a schematic diagram of an object identifier structured by weak identifiers in a tree shape.

FIG. 17 is a schematic diagram of the object identifier structured by weak identifiers in a tree shape. One frame in the figure represents one weak identifier. Hereinafter, each weak identifier forming a tree shape is sometimes referred to as a node identifier. The processing is performed along the arrow direction in identification. The processing is started in the upper weak identifier and ended in the lower weak identifier.

In general, the weak identifiers in the upper position tend to be high in robustness to variation but high in an erroneous identification rate. As the position of the weak identifier is lowered, its robustness to variation becomes low but its identification accuracy in the coincidence of a variation range becomes high by learning. A plurality of series of weak identifiers specialized to a specific variation range (depth direction of a face and variation in expression and illumination) is prepared to create the tree structure, securing a correspondence variation range as a whole.

FIG. 17 illustrates a case where five series of weak identifiers are provided. In FIG. 17, five series of weak identifiers are eventually integrated into one node identifier. The final node identifier performs processing such as comparing cumulative scores of five series, for example, with each other to adopt the identification result of the series with the best score. The node identifier may output identification results of each series as vectors instead of outputting integration into one identification result.

Each weak identifier is an identifier for discriminating two-class issues of intra- and extra-class. However, the node identifiers existing in the base point of a branch determine a branch destination (i.e., which series of weak identifiers should be selected). It is needless to say that the branch destination may be determined while discriminating the two-class issues. Alternatively, all the weak identifiers may perform the processing without determining the branch destination.

Each node identifier may determine whether to stop calculation (stop determination) as well as the two-class issues. The stop determination may be performed by a single node identifier or by thresholding the cumulative output value (determination score) of other node identifiers. There is described above the object identification calculation processing.

According to the above-described exemplary embodiments, the method for converting feature quantity corresponding to variation in an object to be identified is made robust to variation to allow highly accurate identification even if image shooting and variation conditions are different between in registration and in authentication.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-005030 filed Jan. 13, 2009, which is hereby incorporated by reference herein in its entirety.

What is claimed is:

1. An object identification apparatus comprising:
a detection unit configured to detect an object from captured image data;
a feature vector generation unit configured to generate a feature vector from each of a plurality of partial areas of the object detected from the captured image data;
an attribute estimation unit configured to estimate an attribute of an appearance of the object detected from the captured image data;
a feature conversion unit configured to convert the feature vector into object identification data by a converting method corresponding to the estimated attribute of the appearance of the object and the partial area from which the feature vector has been generated, wherein one of a plurality of converting methods is defined in correspondence with each attribute of the object with respect to each of the plurality of partial areas;
an object dictionary data storage unit configured to store object dictionary data obtained by converting each feature vector generated from a partial area of each registered object by respective ones of the plurality of converting methods;
an acquisition unit configured to acquire, from the object dictionary data storage unit, object dictionary data for each of the plurality of partial areas of the object obtained by one of the plurality of converting methods corresponding to the estimated attribute of the appearance of the object detected from the captured image data and respective partial areas; and
an object identification unit configured to identify a class to which the object detected from the captured image data belongs, based on the object identification data obtained by the feature conversion unit and the object dictionary data acquired by the acquisition unit,
the object identification unit configured to use a support vector machine previously trained to identify classes of variation between objects to identify the class;
wherein at least one of the units of the object identification apparatus is implemented by a processor and/or a memory.

2. The object identification apparatus according to claim 1, wherein the attribute estimation unit estimates the attribute of the appearance of the object based on the image data according to an imaging parameter in image capturing.

3. A computer-implemented method for identifying an object, the method comprising:
detecting an object from captured image data;
generating a feature vector from each of a plurality of partial areas of the object detected from the captured image data;
estimating an attribute of an appearance of the object detected from the captured image data;
converting the feature vector into object identification data by a converting method corresponding to the estimated attribute of the appearance of the object and the partial area from which the feature vector has been generated, wherein one of a plurality of converting methods is defined in correspondence with each attribute of the object with respect to each of the plurality of partial areas;
acquiring, from an object dictionary data storage unit, object dictionary data for each of the plurality of partial areas of the object obtained by one of the plurality of converting methods corresponding to the estimated attribute of the appearance of the object detected from the captured image data and respective partial areas, wherein object dictionary data storage unit stores object dictionary obtained by converting each feature vector generated from each registered object by respective ones of the plurality of converting methods;
identifying a class to which the object detected from the captured image data belongs, based on the object identification data obtained by converting the feature and the acquired object dictionary data; and
the object identification unit configured to use a support vector machine previously trained to identify classes of variation between objects to identify the class.

4. A non-transitory computer-readable storage medium storing a program that causes a computer to execute a method for identifying an object, the method comprising:
detecting an object from captured image data;
generating a feature vector from each of a plurality of partial areas of the object detected from the captured image data;
estimating an attribute of an appearance of the object detected from the captured image data;
converting the feature vector into object identification data by a converting method corresponding to the estimated attribute of the appearance of the object and the partial area from which the feature vector has been generated, wherein one of a plurality of converting methods is defined in correspondence with each attribute of the object with respect to each of the plurality of partial areas;
acquiring, from an object dictionary data storage unit, object dictionary data for each of the plurality of partial areas of the object obtained by one of the plurality of converting methods corresponding to the estimated attribute of the appearance of the object detected from the captured image data and respective partial areas, wherein object dictionary data storage unit stores object dictionary obtained by converting each feature vector generated from each registered object by respective ones of the plurality of converting methods;
identifying a class to which the object detected from the captured image data belongs, based on the object identification data obtained by converting the feature and the acquired object dictionary data; and
the object identification unit configured to use a support vector machine previously trained to identify classes of variation between objects to identify the class.

5. The object identification apparatus according to claim 1, wherein the feature conversion unit converts the feature vector into object identification data by reducing a dimension of the feature vector.

* * * * *